United States Patent
Chu

(10) Patent No.: US 8,659,271 B2
(45) Date of Patent: Feb. 25, 2014

(54) FIXED-ON-TIME CONTROLLER UTILIZING AN ADAPTIVE SAW SIGNAL FOR DISCONTINUOUS MODE PFC POWER CONVERSION

(75) Inventor: Yu-Ping Chu, Hsin-Chu (TW)

(73) Assignee: Grenergy Opto Inc., Hsin-Chu (TW)

(*) Notice: Subject to any disclaimer, the term of this patent is extended or adjusted under 35 U.S.C. 154(b) by 426 days.

(21) Appl. No.: 13/069,768

(22) Filed: Mar. 23, 2011

(65) Prior Publication Data

US 2012/0242298 A1 Sep. 27, 2012

(51) Int. Cl.
 *G05F 1/70* (2006.01)
(52) U.S. Cl.
 USPC .............................. 323/207; 363/89
(58) Field of Classification Search
 USPC ........................... 323/207; 363/89
 See application file for complete search history.

(56) References Cited

U.S. PATENT DOCUMENTS

| | | | |
|---|---|---|---|
| 6,469,917 B1* | 10/2002 | Ben-Yaakov | 363/44 |
| 6,768,655 B1* | 7/2004 | Yang et al. | 363/21.01 |
| 2006/0022648 A1* | 2/2006 | Ben-Yaakov et al. | 323/222 |
| 2011/0181264 A1* | 7/2011 | Aiura | 323/288 |
| 2012/0242298 A1* | 9/2012 | Chu | 323/209 |

* cited by examiner

*Primary Examiner* — Jeffrey Sterrett
(74) *Attorney, Agent, or Firm* — Muncy, Geissler, Olds & Lowe, P.C.

(57) ABSTRACT

A fixed-on-time controller utilizing an adaptive saw signal for discontinuous mode PFC power conversion, the fixed-on-time controller comprising: an error amplifier, having a negative input end coupled to a feedback signal, a positive input end coupled to a reference voltage, and an output end for providing a threshold signal; an adaptive current source generator, used to generate an adaptive current source according to the threshold signal; a capacitor, charged by the adaptive current source, being used for carrying a saw signal; a switch, used to discharge the capacitor under the control of a reset signal; and a comparator, having a negative input end coupled to the threshold signal, a positive input end coupled to the saw signal, and an output end for providing a turn-off signal; and a fixed-on-time driver circuit, used to provide a driving signal and the reset signal according to the turn-off signal and a sensing signal.

8 Claims, 5 Drawing Sheets

FIXED-ON-TIME CONTROLLER UTILIZING AN ADAPTIVE SAW SIGNAL FOR DISCONTINUOUS MODE PFC POWER CONVERSION

BACKGROUND OF THE INVENTION

1. Field of the Invention

The present invention relates to a power conversion controller, especially to a fixed-on-time controller for discontinuous mode PFC (Power Factor Correction) power conversion.

2. Description of the Related Art

Fixed-on-time power conversion is capable of achieving good PFC for discontinuous mode power conversion when the line input is a full-wave rectified voltage. The reason is as follows:

Let the line input be $V_{IN}(t)=|V_A \sin(\omega t)|$, the fixed on time=$t_{ON}$, the inductance=L, and the input current at the end of an on period=$I_{INPEAK}(t_X)$, then $I_{INPEAK}(t_X)=(V_{IN}(t_X)/L)$ $t_{ON}=(|V_A \sin(\omega t_X)|/L)t_{ON}$, wherein $t_{ON}$ is much smaller than $2\pi/\omega$. As can be seen in the above equation, the input current will follow the line input at every on period and a good power factor correction is therefore achieved.

To get insight into the principle of the fixed-on-time discontinuous mode PFC power conversion, please refer to FIG. 1, which illustrates a block diagram of a discontinuous mode PFC power converter using a prior art fixed-on-time controller. As illustrated in FIG. 1, the discontinuous mode PFC power converter includes an input rectifier circuit 101, a transformer circuit 102, an output rectifier circuit 103, a load 104, a resistor 105, and a fixed-on-time controller 110.

The input rectifier circuit 101 is used to generate a full wave rectified voltage $V_{FULL\_WAVE}$ according to an AC power $V_{AC}$.

The transformer circuit 102 is used to transfer the power from the full wave rectified voltage $V_{FULL\_WAVE}$ to the output rectifier circuit 103, under the control of a driving signal $V_{DRV}$ of the fixed-on-time controller 110.

The output rectifier circuit 103 is used to provide a DC voltage $V_O$ to the load 104, and the resistor 105 is used to provide a feedback signal $V_{FB}$ for the fixed-on-time controller 110.

The fixed-on-time controller 110 includes an error amplifier 111, a constant current source 112, a capacitor 113, a switch 114, a comparator 115, and a fixed-on-time driver circuit 116.

The error amplifier 111 has a negative input end coupled to the feedback signal $V_{FB}$, a positive input end coupled to a reference voltage $V_{REF}$, and an output end for providing a threshold signal $V_{COMP}$.

The constant current source 112, the capacitor 113, and the switch 114 are used to generate a saw signal $V_{SW}$.

The comparator 115 has a negative input end coupled to the threshold signal $V_{COMP}$, a positive input end coupled to the saw signal $V_{SW}$, and an output end for providing a turn-off signal $V_{OFF}$.

The fixed-on-time driver circuit 116 is used to provide the driving signal $V_{DRV}$ for the transformer circuit 102 and a reset signal RESET for the switch 114, according to the turn-off signal $V_{OFF}$ from the comparator 115 and a sensing signal $V_{AUX}$ from the transformer circuit 102, wherein the sensing signal $V_{AUX}$ is used to indicate the end of an inductor current discharging period of the transformer circuit 102, and the active time point of the reset signal RESET follows that of the turn-off signal $V_{OFF}$.

When in operation, the voltage of the driving signal $V_{DRV}$ will arise from a low level to a high level after the sensing signal $V_{AUX}$ becomes active, and fall from a high level to a low level after the turn-off signal $V_{OFF}$ becomes active. Besides, the period the driving signal $V_{DRV}$ remains at a high level—the on time of the transformer circuit 102—will be fixed to a value by the feedback control mechanism of the power conversion to transfer a specific amount of energy per cycle from the AC power $V_{AC}$ to the load 104, to regulate $V_{FB}$ at $V_{REF}$.

However, as the period the driving signal $V_{DRV}$ remains at a high level—a fixed on time of the transformer circuit 102 corresponding to a load value of the load 104 and a line voltage of the AC power $V_{AC}$—is ended when the saw signal $V_{SW}$ reaches the threshold signal $V_{COMP}$, the threshold signal $V_{COMP}$ will exhibit a large level shift to change the period of the fixed on time from a short/long value to a long/short value when the load value of the load 104 or the line voltage of the AC power $V_{AC}$ changes drastically.

Please refer to FIG. 2, which illustrates the waveforms of major signals in the prior art fixed-on-time controller 110 of FIG. 1 corresponding to a low line and a high line of the AC power $V_{AC}$ respectively. As illustrated in FIG. 2, $V_{DRV,\ LOW\_LINE}$ (the driving signal $V_{DRV}$ generated corresponding to a low line of the AC power $V_{AC}$) has a fixed on time $t_{ON1}$, and $V_{DRV,\ HIGH\_LINE}$ (the driving signal $V_{DRV}$ generated corresponding to a high line of the AC power $V_{AC}$) has a fixed on time $t_{ON2}$, wherein $t_{ON1}$ is longer than $t_{ON2}$ such that same power is delivered to the load 104. As the fixed on time is ended when the saw signal $V_{SW}$—of which the ramping up slope is fixed by the constant current source 112—reaches the threshold signal $V_{COMP}$, the fixed on time is then controlled by the level of the threshold signal $V_{COMP}$. As such, a higher $V_{COMP,\ LOW\_LINE}$ (the threshold signal $V_{COMP}$ corresponding to the low line of the AC power $V_{AC}$) is generated to allow a higher $V_{SW,\ LOW\_LINE}$ (the saw signal $V_{SAW}$ corresponding to the low line of the AC power $V_{AC}$) and therefore the longer $t_{ON1}$; and a lower $V_{COMP,\ HIGH\_LINE}$ (the threshold signal $V_{COMP}$ corresponding to the high line of the AC power $V_{AC}$) is generated to allow a lower $V_{SW,\ HIGH\_LINE}$ (the saw signal $V_{SAW}$ corresponding to the high line of the AC power $V_{AC}$) and therefore the shorter $t_{ON2}$, wherein the $V_{COMP,\ LOW\_LINE}$ is higher than the $V_{COMP,\ HIGH\_LINE}$ by $\Delta V_1$.

That is, $\Delta V_1$ of the prior art fixed-on-time controller 110 can be a large value when the load value of the load 104 or the line voltage of the AC power $V_{AC}$ changes drastically. However, large $\Delta V_1$ is adverse to the design of the error amplifier 111. To minimize $\Delta V_1$, one solution is to change the capacitance of the capacitor 113 to cope with the amplitude variation of the AC power $V_{AC}$ or the load value variation of the load 104. However, it is bothersome to change the capacitor 113 whenever the AC power $V_{AC}$ or the load 104 is changed, and besides, the solution is adverse to the integration of the capacitor 113 into the fixed-on-time controller 110.

In view of these problems, the present invention proposes a novel fixed-on-time controller for discontinuous mode PFC power conversion.

SUMMARY OF THE INVENTION

One objective of the present invention is to propose a fixed-on-time controller for discontinuous mode PFC power conversion, in which a saw signal adaptive to the line input amplitude variation or the load condition variation is generated to relieve the performance requirement of an error amplifier used in the fixed-on-time controller.

Another objective of the present invention is to propose a fixed-on-time controller for discontinuous mode PFC power conversion, in which a saw signal adaptive to the line input amplitude variation or the load condition variation is generated to facilitate the integration of a capacitor for carrying the saw signal into the fixed-on-time controller.

To achieve the foregoing objectives of the present invention, a fixed-on-time controller utilizing an adaptive saw signal for discontinuous mode PFC power conversion is proposed, the fixed-on-time controller including:

an error amplifier, having a negative input end coupled to a feedback signal, a positive input end coupled to a reference voltage, and an output end for providing a threshold signal;

an adaptive current source generator, used to generate an adaptive current source according to the threshold signal, wherein the adaptive current source becomes larger/smaller as the threshold signal goes lower/higher;

a capacitor, charged by the adaptive current source, being used for carrying a saw signal;

a switch, used to discharge the capacitor under the control of a reset signal;

a comparator, having a negative input end coupled to the threshold signal, a positive input end coupled to the saw signal, and an output end for providing a turn-off signal; and a fixed-on-time driver circuit, used to provide a driving signal for an external transformer circuit and the reset signal for the switch, according to the turn-off signal from the comparator and a sensing signal from the external transformer circuit, wherein the sensing signal is used to indicate the end of an inductor current discharging period of the external transformer circuit, and the active time point of the reset signal follows that of the turn-off signal.

To make it easier for our examiner to understand the objectives of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
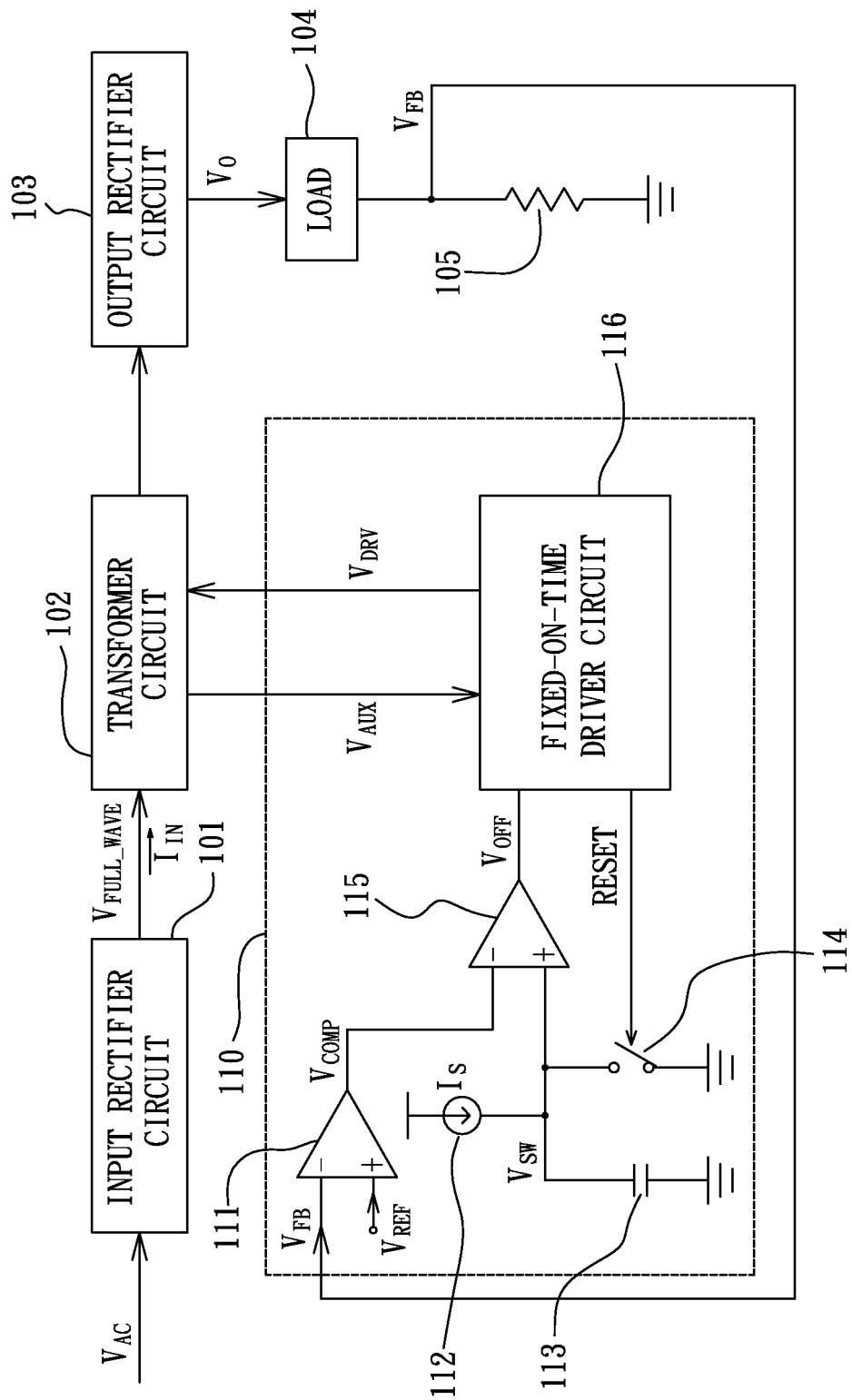
FIG. 1 illustrates a block diagram of a discontinuous mode PFC power converter using a prior art fixed-on-time controller.
Figure 2:
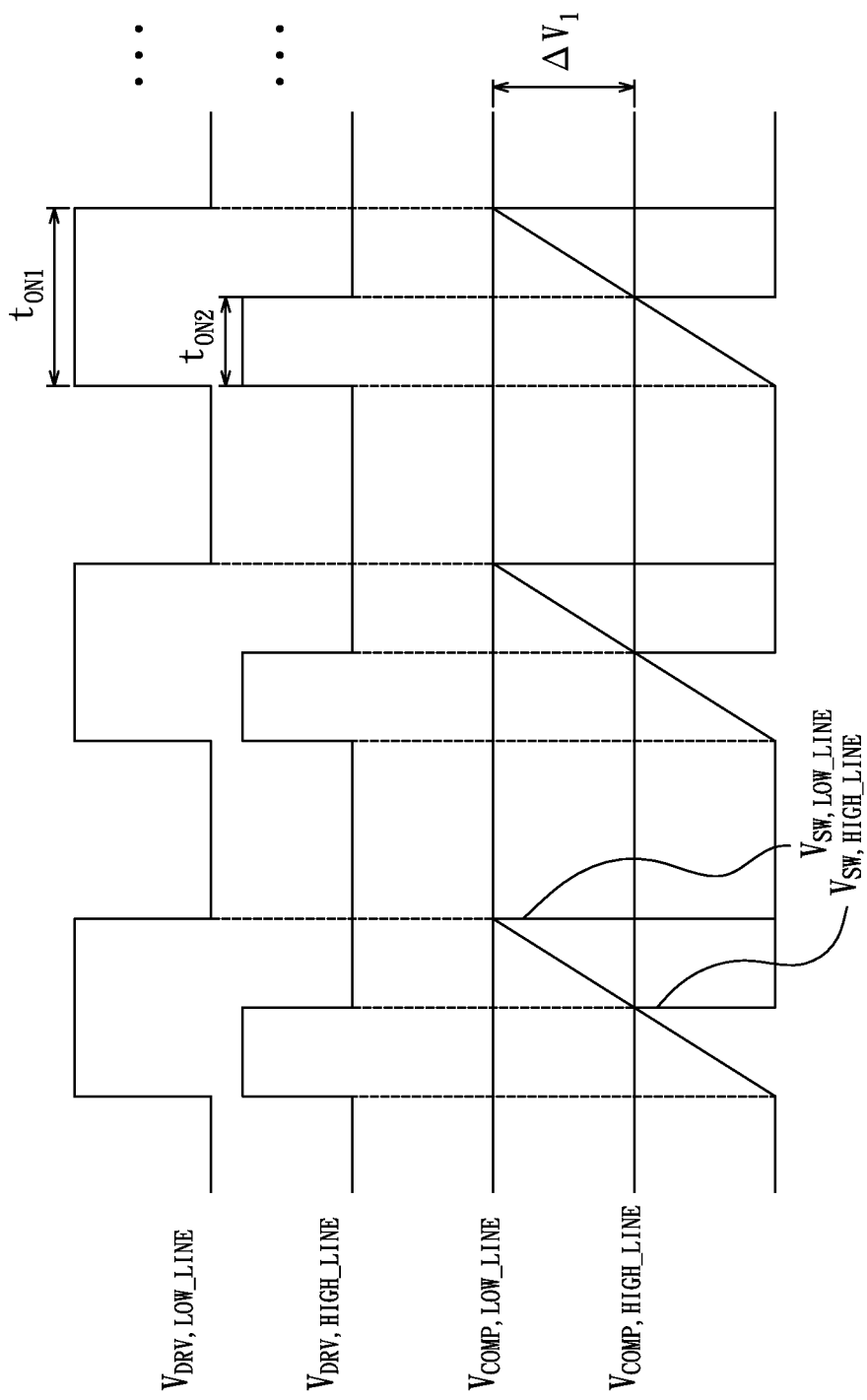
FIG. 2 illustrates the waveforms of major signals in the prior art fixed-on-time controller of FIG. 1 corresponding to a low line and a high line of the AC power $V_{AC}$ respectively.
Figure 3:
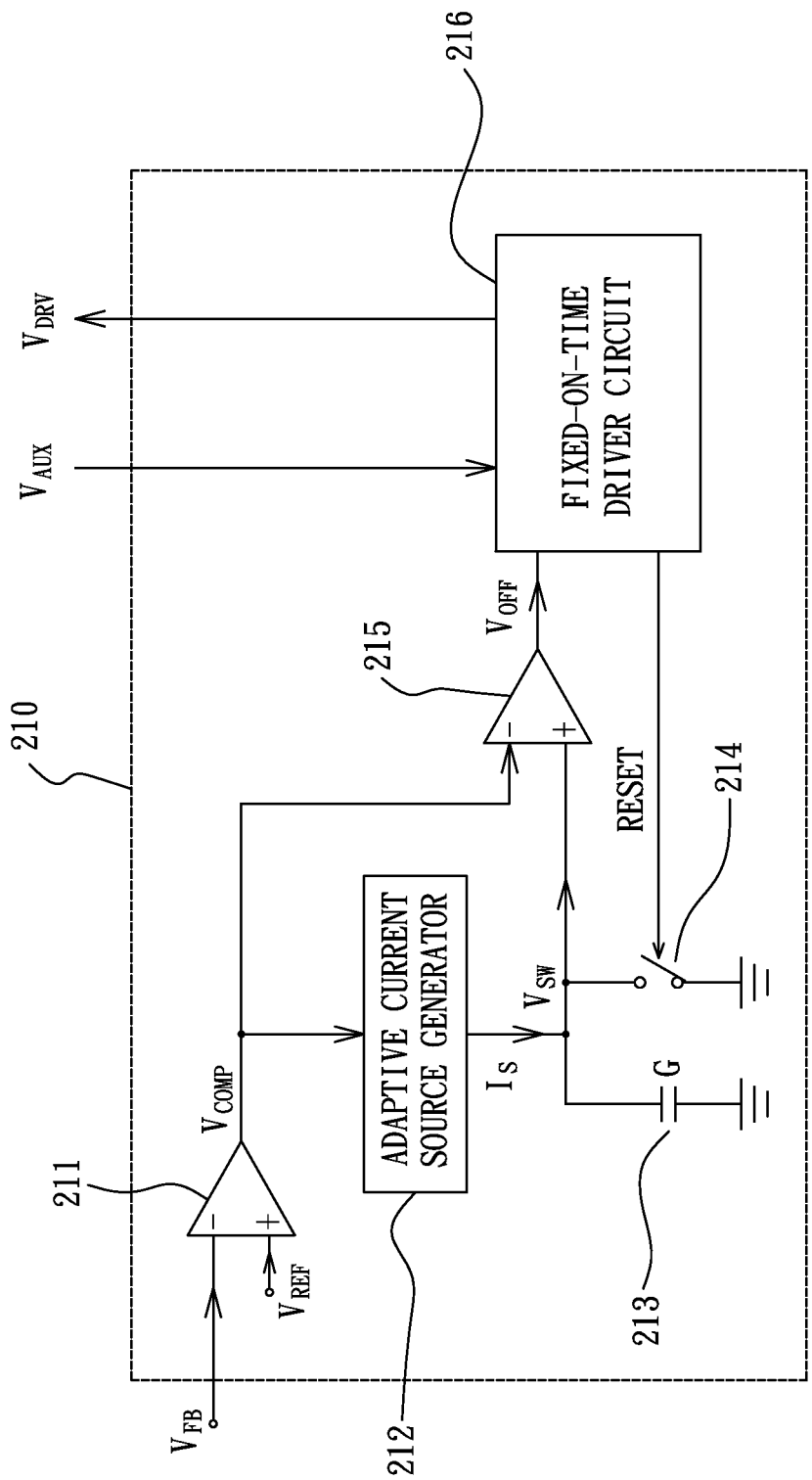
FIG. 3 illustrates a block diagram of a fixed-on-time controller utilizing an adaptive saw signal for discontinuous mode PFC power conversion according to a preferred embodiment of the present invention.

Please refer to FIG. 3, which illustrates a block diagram of a fixed-on-time controller 210 utilizing an adaptive saw signal for discontinuous mode PFC power conversion according to a preferred embodiment of the present invention. As is illustrated in FIG. 3, the fixed-on-time controller 210 includes an error amplifier 211, an adaptive current source generator 212, a capacitor 213, a switch 214, a comparator 215, and a fixed-on-time driver circuit 216.

The error amplifier 211 has a negative input end coupled to a feedback signal $V_{FB}$, a positive input end coupled to a reference voltage $V_{REF}$, and an output end for providing a threshold signal $V_{COMP}$.

Figure 4:
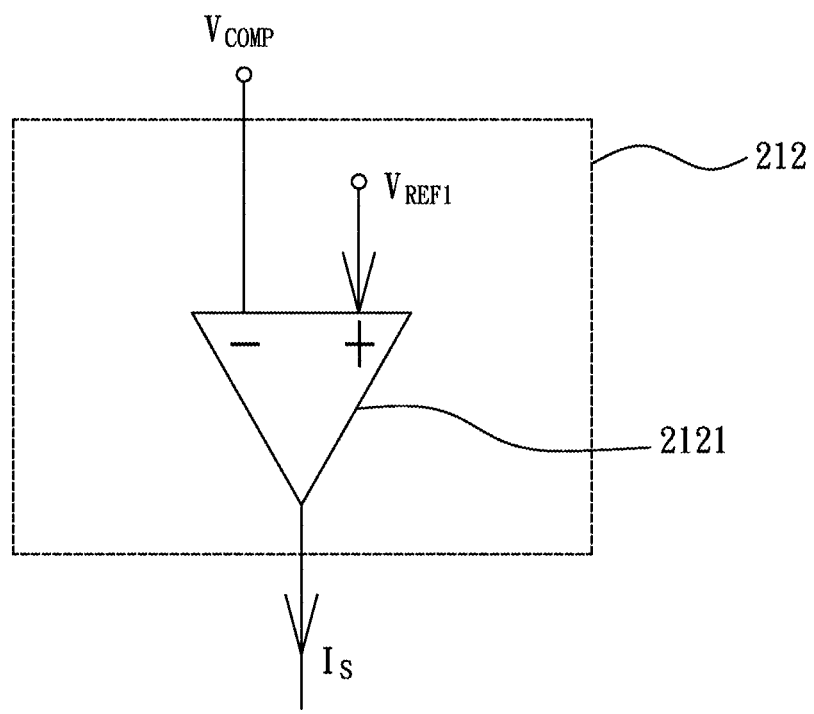
FIG. 4 illustrates a preferred embodiment of the adaptive current source generator in the controller of FIG. 3.

The adaptive current source generator 212 is used to generate an adaptive current source $I_S$ according to the threshold signal $V_{COMP}$, wherein the adaptive current source $I_S$ becomes larger/smaller as the threshold signal $V_{COMP}$ goes lower/higher. Please refer to FIG. 4, which illustrates a preferred embodiment of the adaptive current source generator 212. As illustrated in FIG. 4, the adaptive current source generator 212 includes an OTA (Operational Transconductance Amplifier) 2121, which has a negative input end coupled to the threshold signal $V_{COMP}$, a positive input end coupled to a first reference voltage $V_{REF1}$, and an output end for providing the adaptive current source $I_S = I_{S0} + G_m(V_{REF1} - V_{COMP})$, wherein $I_{S0}$ is a quiescent current, and $G_m$ is the transconductance of the OTA 2121.

The capacitor 213, charged by the adaptive current source $I_S$, is used for carrying a saw signal $V_{SW}$. The capacitor 213 is preferred to be integrated into the fixed-on-time controller 210, however it can also be an external component if required.

The switch 214 is used to discharge the capacitor 213 under the control of a reset signal RESET.

The comparator 215 has a negative input end coupled to the threshold signal $V_{COMP}$, a positive input end coupled to the saw signal $V_{SW}$, and an output end for providing a turn-off signal $V_{OFF}$.

The fixed-on-time driver circuit 216 is used to provide a driving signal $V_{DRV}$ for an external transformer circuit and the reset signal RESET for the switch 214, according to the turn-off signal $V_{OFF}$ from the comparator 215 and a sensing signal $V_{AUX}$ from the external transformer circuit, wherein the sensing signal $V_{AUX}$ is used to indicate the end of an inductor current discharging period of the external transformer circuit, and the active time point of the reset signal RESET follows that of the turn-off signal $V_{OFF}$.

When the fixed-on-time controller 210 is used in a discontinuous mode PFC power conversion, the fixed-on-time required to fulfill the power conversion from an AC power to a load will result in a corresponding level of the threshold signal $V_{COMP}$ and a corresponding value of the adaptive current source $I_S$; and the difference between $V_{COMP, LOW\_LINE}$ and $V_{COMP, HIGH\_LINE}$ will be reduced because the adaptive current source $I_S$—affected by $V_{COMP}$—will modify the ramping up slope of the saw signal $V_{SW}$ such that $V_{COMP, LOW\_LINE}$ has to be lowered down and $V_{COMP, HIGH\_LINE}$ has to be pulled up to generate the required $t_{ON1}$ and $t_{ON2}$ respectively.

Figure 5:
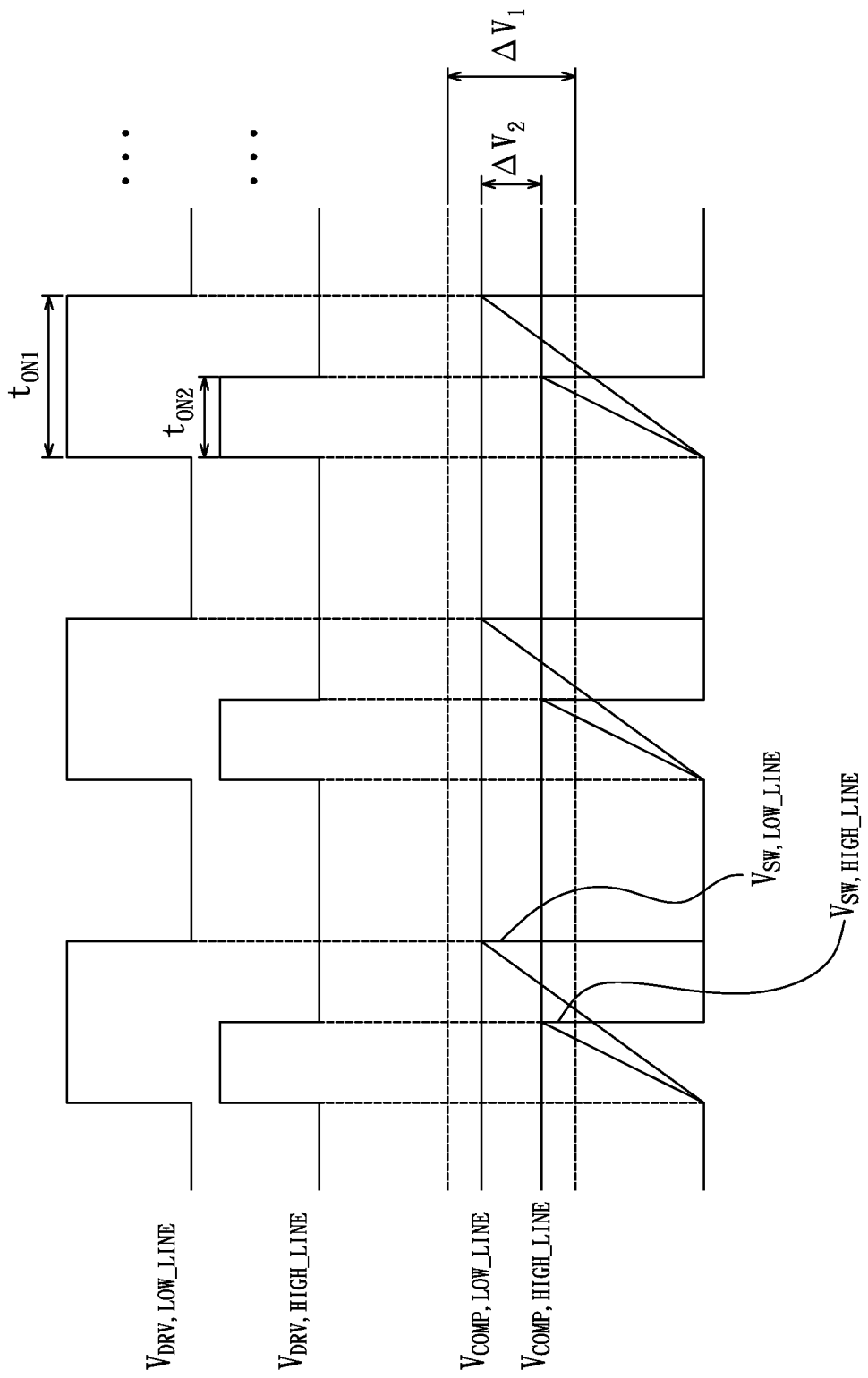
FIG. 5 illustrates the waveforms of major signals in the controller of FIG. 3 corresponding to a low line AC power and a high line AC power respectively.

Please refer to FIG. 5, which illustrates the waveforms of major signals in the fixed-on-time controller 210 of FIG. 3 corresponding to a low line and a high line of the AC power $V_{AC}$ respectively. As illustrated in FIG. 5, $V_{DRV, LOW\_LINE}$ (the driving signal $V_{DRV}$ generated corresponding to a low line of the AC power $V_{AC}$) has a fixed on time $t_{ON1}$, and $V_{DRV, HIGH\_LINE}$ (the driving signal $V_{DRV}$ generated corresponding to a high line of the AC power $V_{AC}$) has a fixed on time $t_{ON2}$, wherein $t_{ON1}$ is longer than $t_{ON2}$ such that same power is delivered to a load. As the ramping up slope of the saw signal $V_{SW}$ is determined by the threshold signal $V_{COMP}$ in a way that lower/higher level of $V_{COMP}$ results in higher/lower slope of the saw signal $V_{SW}$, $V_{COMP, HIGH\_LINE}$ will then be shifted upward by the negative feedback control mechanism of the power conversion to allow a higher $V_{SW, HIGH\_LINE}$ and thereby provide the required $t_{ON2}$, while $V_{COMP, LOW\_LINE}$ will be shifted downward by the negative feedback control mechanism of the power conversion to lower $V_{SW, LOW\_LINE}$ and thereby provide the required $t_{ON1}$, and the difference between $V_{COMP, LOW\_LINE}$ and $V_{COMP, HIGH\_LINE}$ will be reduced from $\Delta V_1$ to $\Delta V_2$.

As can be seen from the specification above, by using the adaptive current source generator, the error amplifier of the fixed-on-time controller can be implemented much easier, and the capacitor used for carrying the saw signal can be integrated into the fixed-on-time controller, so the present invention does improve the prior art controllers and is worthy of being granted a patent.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A fixed-on-time controller utilizing an adaptive saw signal for discontinuous mode PFC power conversion, said fixed-on-time controller comprising:
    an error amplifier, having a negative input end coupled to a feedback signal, a positive input end coupled to a reference voltage, and an output end for providing a threshold signal;
    an adaptive current source generator, used to generate an adaptive current source according to said threshold signal, wherein said adaptive current source becomes larger/smaller as said threshold signal goes lower/higher;
    a capacitor, charged by said adaptive current source, being used for carrying a saw signal;
    a switch, used to discharge said capacitor under the control of a reset signal;
    a comparator, having a negative input end coupled to said threshold signal, a positive input end coupled to said saw signal, and an output end for providing a turn-off signal; and
    a fixed-on-time driver circuit, used to provide a driving signal for an external transformer circuit and said reset signal for said switch, according to said turn-off signal from said comparator and a sensing signal from said external transformer circuit,
    wherein said sensing signal is used to indicate the end of an inductor current discharging period of said external transformer circuit, and the active time point of said reset signal follows that of said turn-off signal.

2. The fixed-on-time controller utilizing an adaptive saw signal for discontinuous mode PFC power conversion as claim 1, wherein said adaptive current source generator comprises an OTA.

3. A fixed-on-time controller utilizing an adaptive saw signal for discontinuous mode PFC power conversion, said fixed-on-time controller comprising:
    an error amplifier, having a negative input end coupled to a feedback signal, a positive input end coupled to a reference voltage, and an output end for providing a threshold signal;
    an adaptive current source generator, used to generate an adaptive current source according to said threshold signal, wherein said adaptive current source becomes larger/smaller as said threshold signal goes lower/higher;
    a capacitor, charged by said adaptive current source, being used for carrying a saw signal;
    a switch, used to discharge said capacitor under the control of a reset signal; and
    a comparator, having a negative input end coupled to said threshold signal, a positive input end coupled to said saw signal, and an output end for providing a turn-off signal.

4. The fixed-on-time controller utilizing an adaptive saw signal for discontinuous mode PFC power conversion as claim 3, further comprising a fixed-on-time driver circuit, used to provide a driving signal for an external transformer circuit and said reset signal for said switch, according to said turn-off signal from said comparator and a sensing signal from said external transformer circuit, wherein said sensing signal is used to indicate the end of an inductor current discharging period of said external transformer circuit, and the active time point of said reset signal follows; that of said turn-off signal.

5. The fixed-on-time controller utilizing an adaptive saw signal for discontinuous mode PFC power conversion as claim 3, wherein said adaptive current source generator comprises an OTA.

6. A fixed-on-time controller utilizing an adaptive saw signal for discontinuous mode PFC power conversion, said fixed-on-time controller comprising:
    an error amplifier, having a negative input end coupled to a feedback signal, a positive input end coupled to a reference voltage, and an output end for providing a threshold signal; and
    an adaptive current source generator, used to generate an adaptive current source according to said threshold signal in a way that said adaptive current source becomes larger/smaller as said threshold signal goes lower/higher, wherein said adaptive current source is used for charging an external capacitor to generate a saw signal;
    a switch, used to discharge said external capacitor under the control of a reset signal;
    a comparator, having a negative input end coupled to said threshold signal, a positive input end coupled to said saw signal, and an output end for providing a turn-off signal.

7. The fixed-on-time controller utilizing an adaptive saw signal for discontinuous mode PFC power conversion as claim 6, wherein said adaptive current source generator comprises an OTA.

8. The fixed-on-time controller utilizing an adaptive saw signal for discontinuous mode PFC power conversion as claim 6, further comprising a fixed-on-time driver circuit, used to provide a driving signal for an external transformer circuit and said reset
    signal for said switch, according to said turn-off signal from said comparator and a sensing signal from said external transformer circuit, wherein said sensing signal is used to indicate the end of an inductor current discharging period of said external transformer circuit, and the active time point of said reset signal follows that of said turn-off signal.

* * * * *